United States Patent [19]

Kyuchukov et al.

[11] 4,291,580

[45] Sep. 29, 1981

[54] MANOMETER BODY

[75] Inventors: Yanko P. Kyuchukov; Bojidar M. Srebrov, both of Varna, Bulgaria

[73] Assignee: ZM "Cherno More", Varna, Bulgaria

[21] Appl. No.: 889,394

[22] Filed: Mar. 23, 1978

[51] Int. Cl.³ .............................................. G01L 7/04
[52] U.S. Cl. ................................... 73/741; 219/69 E; 219/69 M
[58] Field of Search .............. 219/69 E, 69 G, 69 M, 219/69 R; 73/741

[56] References Cited

U.S. PATENT DOCUMENTS

| 1,436,895 | 11/1922 | Nelson | 73/741 |
| 2,186,872 | 1/1940 | Klein | 73/741 |
| 2,360,202 | 10/1944 | Courtney | 73/741 |
| 2,818,490 | 12/1957 | Dixon et al. | 219/69 E |
| 3,125,700 | 3/1964 | Bentley et al. | 219/69 G |
| 3,497,663 | 2/1970 | Turner | 219/69 E |
| 3,757,582 | 9/1973 | Sellmaier et al. | 73/741 |

FOREIGN PATENT DOCUMENTS

| 2520750 | 11/1975 | Fed. Rep. of Germany | 219/69 E |
| 312725 | 10/1971 | U.S.S.R. | 219/69 |
| 506480 | 5/1976 | U.S.S.R. | 219/69E |

Primary Examiner—C. C. Shaw
Attorney, Agent, or Firm—Karl F. Ross

[57] ABSTRACT

A manometer body is electroerrosively formed with an arcuate hole having a tubular core with the body of the core being simultaneously formed in the electrical machining operation so that the Bourdon tube is fixed in place by soldering with a minimum of solder.

1 Claim, 4 Drawing Figures

MANOMETER BODY

FIELD OF THE INVENTION

This invention relates to a manometer body and an apparatus for machining the hole for fastening the Bourdon tube to said body.

BACKGROUND OF THE INVENTION

A body for a manometer is known which has a prismatic shape, its one end ending with a thread and inlet hole for connection with the source of the measured fluid. In the other end of the body, in an axial plane, there is machined a hole in which is rigidly fastened a Bourdon tube. The hole is a blind straight bore, defined between two symmetrical semicylindrical surfaces of equal radius, disposed at a distance from one another and connected straight flanks at the ends of the arcuate surfaces. In the upper portion of the blind straight bore there is machined a chamfer.

A drawback of this body is that the hole does not correspond in geometrical shape and size to the Bourdon tube. This results in a reduction of the reliability of the bond between body and Bourdon tube and in an increase of solder consumption.

The machining of the hole for fastening the Bourdon tube to the body is performed on a milling machine.

The drawback of the machining operation is that, because of the great depth of that bore, the machining time is considerable and complex tools must be used.

OBJECT OF THE INVENTION

It is therefore a general object of the present invention to avoid the aforementioned drawbacks by providing an improved manometer body as well as an apparatus for machining the hole for fastening the Bourdon tube to said body.

SUMMARY OF THE INVENTION

This object is achieved by a manometer body of prismatic shape, the one end of which ends with a thread and an inlet hole for connection with the measured fluid. In the other end of the body, in an axial plane, there is machined the hole for fastening the Bourdon tube. This hole is blind, and profiled, forms an arc with a radius equal to the radius of the Bourdon tube. Moreover, this body is provided with a core in which is formed an arc-shaped hole whose axis coincides with the axis of the Bourdon tube.

The apparatus for machining the hole for fastening the Bourdon tube to the body comprises a driving mechanism to which a hollow shaft is rigidly attached, this shaft being provided with an immovable short arm. A tool electrode is fastened to the short arm. To the other end of the hollow shaft there is fastened rigidly a mechanism for fixing the depth of the profiled hole; this mechanism comprises an enclosing body fastened rigidly to the hollow shaft. Onto the enclosing body with a central immovable arm there is supported a body with an angular arrangement of the main arm and an arm with electromagnetic breaker.

The advantages of the proposed manometer body and apparatus for machining the hole for fastening the Bourdon tube to the body lie in that the machined profiled hole provides a reliable connection with the Bourdon tube. Moreover, the consumption of solder for fastening the Bourdon tube to the body is reduced.

BRIEF DESCRIPTION OF THE DRAWING

For a better understanding of the invention, reference should be made to the accompanying drawing in which there is illustrated a preferred embodiment of the invention. In the drawing.

SPECIFIC DESCRIPTION

Figure 1:
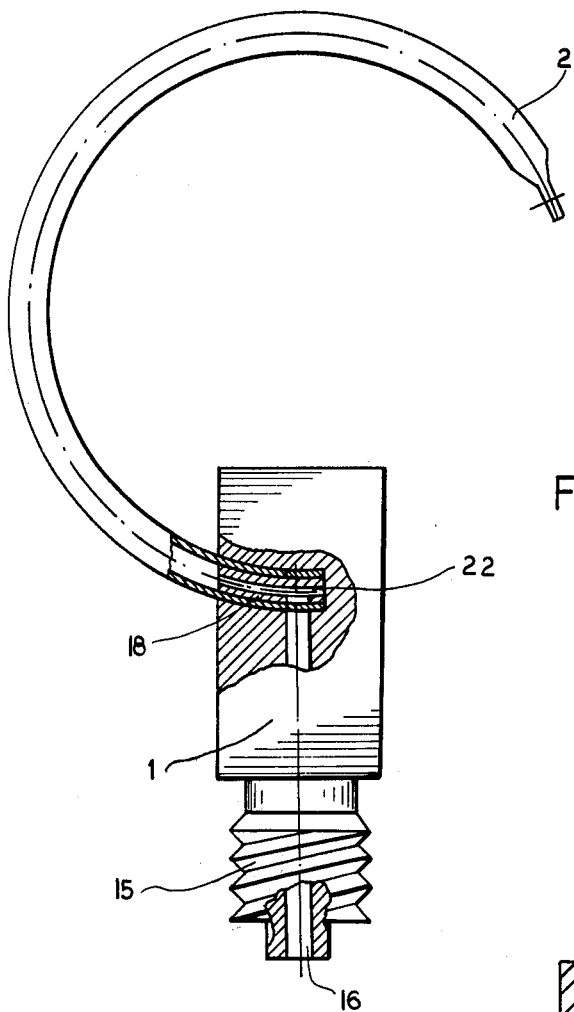
FIG. 1 is a partial cross-sectional longitudinal view of the body of a manometer with its Bourdon tube in place.
Figure 3:
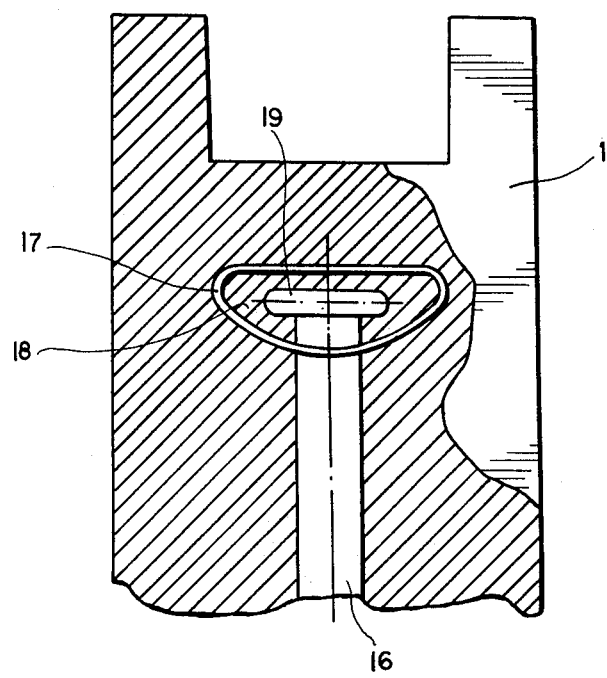
FIG. 3 is a view similar to FIG. 1 showing the Bourdon tube removed.
Figure 2:
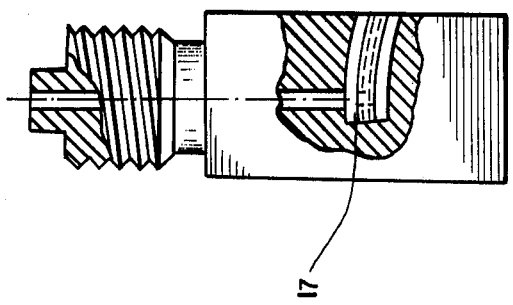
FIG. 2 is a partial cross-sectional longitudinal view of the manometer body taken in a plane perpendicular to the profiled hole.
Figure 4:
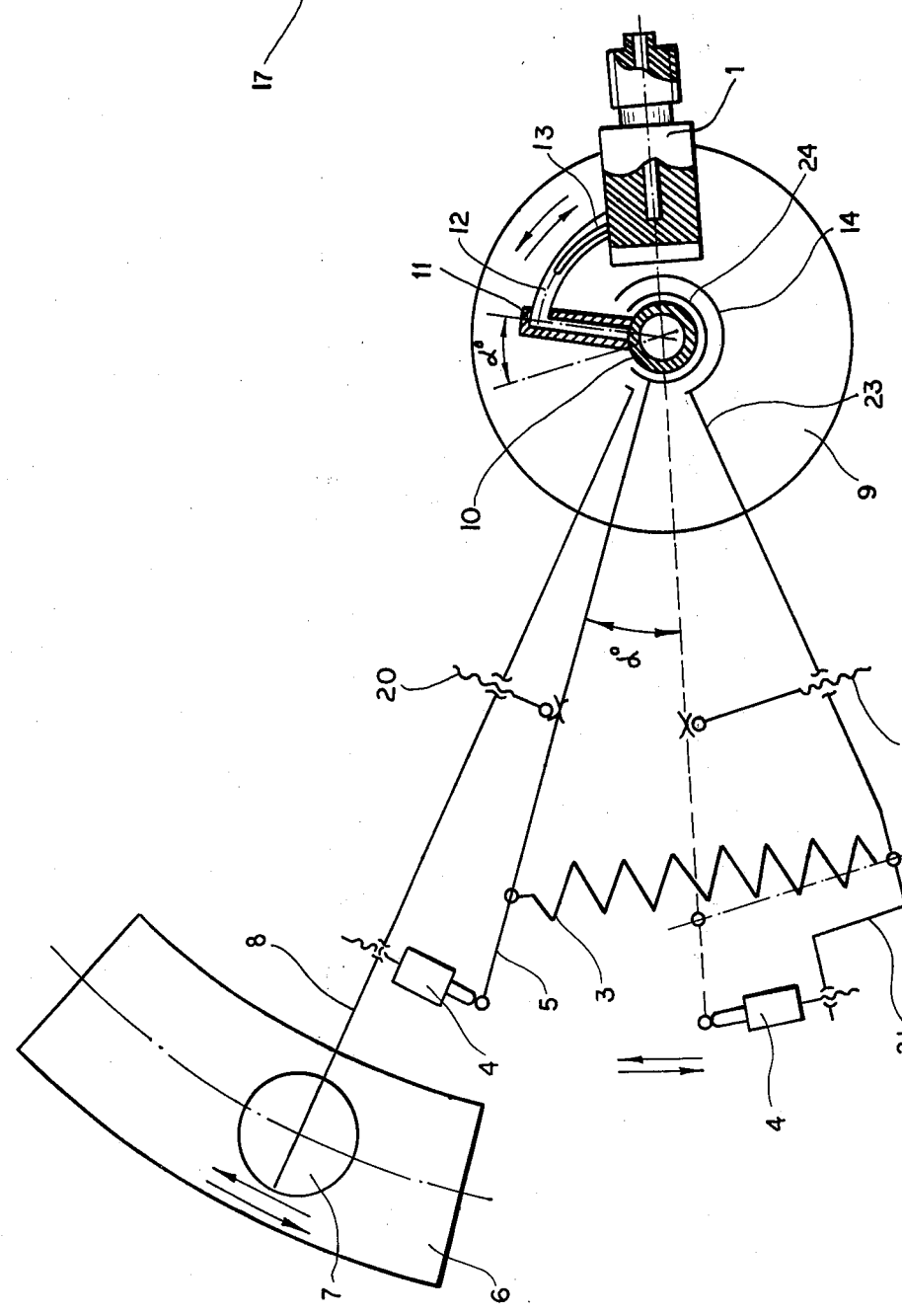
FIG. 4 is a diagrammatic illustration of an apparatus for machining the hole for fastening the Bourdon tube to the body.

The body 1 of the manometer is of prismatic shape. One end of the body terminates in a thread 15 and an inlet hole 16 for connection with the source of measured fluid. In the other end of body 1, in a plane passing through its axis, there is machined a profiled hole 17, into which the Bourdon tube 2 is fastened rigidly. The profiled hole 17 is blind and arcuate with a radius equal to the radius of the Bourdon tube 2. The profiled hole 17 is provided with a core 18 with a connecting hole 19 for connection with the inlet hole 16 and the Bourdon tube 2. The axis of the connecting arcuate hole 19 coincides with the axis of the Bourdon tube 2.

The apparatus for machining the profiled hole 17 for fastening the Bourdon tube 2 to the body 1 comprises a drive mechanism 9 connected rigidly to a hollow shaft 10 with a short arm 11, through which a dielectric is passed. An electrode tool 12 is attached rigidly to the short arm 11. The geometric shape and the size of the tool electrode 12 are the same as those of the Bourdon tube 2. In its hole there is formed rigidly an additional core 13 to form the bore 19. To the hollow shaft 10 there is fastened rigidly a mechanism 23 for fixing the depth of the profiled hole. Mechanism 23 comprises an enclosing body 24, which is rigidly fastened to the hollow shaft 10. Housing 14 is supported over the enclosing body 24 with central arm 5. To the housing 14 are attached angularly and rigidly the main arm 21 and the arm 8. Fastened to arm 8 is an electromagnetic breaker 7 which is adjustable on the stationary base 6. Electrical contactors 4 and regulatable stops 20 for limiting the angular rotation of the central arm 5 are fastened rigidly to arm 8 and base arm 21. The central arm 5 is connected to the main arm 21 by means of spring 3.

The apparatus functions as follows:

After positioning the body 1 on the apparatus, the driving mechanism 9 is electrically switched-on. The driving mechanism 9 rotates the tool electrode 12 and the short arm 11 together with the central arm 5, the arm 8 and the main arm 21. The tool electrode 12 rotates angularly until it makes contact with body 1. With the switching-on of drive mechanism 9, dielectric is supplied through the hollow shaft 10 and the tool electrode 12, and the electric supply to the tool electrode 12 and body 1, the action of electromagnetic breaker 7 is switched-off, and as a result arm 8 is locked to the stationary base 6. Then the drive mechanism 9 performs a feeding working motion to achieve electroerosive machining of profiled hole 17 and connecting hole 19 in body 1, rotating the central arm 5 through a predetermined angle $\alpha$, determining the length of the machined profiled hole 17 and connecting hole 19. At reaching limit stop 4, the electric supply is cut-off and the delivery of dielectric and the machining are interrupted. Then the driving mechanism is switched-on in the opposite direction and the central arm 5 returns in its initial position. As a result of electroerosive machining, the working portion of the tool electrode 12 is worn. For the purpose of multiple use of the tool electrode 12 for machining profiled holes 17 of equal geometric shape and sizes, the polarity and conditions of tool electrode 12 and body 1 are automatically altered.

In each next-following machining of a body 1, mechanism 23 rotates angularly until contact of tool electrode 12 and body 1. Then the polarity and the conditions are altered and as a result the shape of tool electrode 12 is restored. The time for restoring the tool electrode 12 is experimentally predetermined. After expiration of this time, arm 8 is automatically locked to the station-base 6 and the polarity and conditions are altered. Then follows the machining of the next-following profiled hole 17 in body 1, which has the same geometrical shape and sizes as the preceding one.

A variant of the apparatus of the invention is possible, which can use simultaneously more than one tool electrode 12 for simultaneous machining of a corresponding number of profiled holes 17 and connecting holes 19 in body 1.

What we claim is:

1. A manometer body adapted to receive an arcuate Bourdon tube and capable of being soldered thereto, comprising an elongated prismatic solid member formed at one axial end with a threaded fitting provided with a passage for connecting said body to a source of fluid whose pressure is to be measured, said member being formed within said body with an arcuate bore of generally elliptical cross section having the curvature of said Bourdon tube and communicating with said passage within said member and opening at a face of said member, said member being formed in one piece with an arcuate core of generally elliptical cross section and of the same curvature as said bore and said tube and extending within said bore to said face and ending at the plane thereof whereby said core has all around clearance of uniform crosssection from the remainder of said member in the region of said face, said core being provided with an arcuate hole of the same curvature as that of said core and said bore communicating with said passage, said hole having a generally elliptical cross section.

* * * * *